United States Patent [19]
Yoshida et al.

[11] 4,131,922
[45] Dec. 26, 1978

[54] OPERATION DEVICE OF TAPE RECORDER

[75] Inventors: Masashi Yoshida, Nakaminato; Yasuo Iino, Katsuta; Katsuya Sato, Mito, all of Japan

[73] Assignee: Hitachi, Ltd., Japan

[21] Appl. No.: 864,263

[22] Filed: Dec. 27, 1977

[30] Foreign Application Priority Data

Dec. 27, 1976 [JP] Japan .................. 51-156538

[51] Int. Cl.$^2$ .................. G11B 15/10; G11B 15/26; G11B 15/32
[52] U.S. Cl. .................. 360/90; 242/200; 360/96; 360/105
[58] Field of Search .................. 360/90, 96, 94, 71–72, 360/74, 132, 134; 242/197–200, 206, 208, 209

[56] References Cited

U.S. PATENT DOCUMENTS

| | | | |
|---|---|---|---|
| 3,751,042 | 8/1973 | Platt | 360/105 |
| 3,940,792 | 2/1976 | Herleth | 360/96 |
| 4,000,514 | 12/1976 | Fukatsu | 360/96 |
| 4,031,556 | 6/1977 | Ban et al. | 360/74 |
| 4,059,244 | 11/1977 | Payant | 360/96 |

Primary Examiner—Alfred H. Eddleman
Attorney, Agent, or Firm—Craig & Antonelli

[57] ABSTRACT

An operation device of a tape recorder adapted to bring mechanisms such as a pinch roller, magnetic heads and so on into constant-speed tape feeding condition, making use of a part of torque of a member such as a capstan which is driven by a motor. The device has a manual operation system and an automatic actuating system. The manual operation system includes a manually operable constant-speed tape feed operation member and first locking means adapted to lock the manual operation member at an operation position to which the same has been displaced. The automatic actuating system includes a first rotary body adapted to be rotated in relation with the rotation of the shaft of the motor, a second rotary body having an engageable portion capable of performing a torque-transmitting engagement with the first rotary body and a non-engageable portion which cannot engage the first rotary body, an actuating plate adapted to be displaced by the rotation of the second rotary body and to control the position of the mechanisms, and second locking means to lock the mechanisms at a position to which they have been displaced. As the operation member is operated, it is locked at the operation position by the first locking means. A part of power for displacing the operation member to the operation position is transmitted to the second rotary body, which has confronted the first rotary body at its non-engageable portion, is slightly rotated to bring its engageable portion into engagement with the first rotary body, so as to be continuously driven by the latter. As the second rotary body is driven, it displaces the mechanisms through the actuating plate, and the mechanisms are held at the position to which they have been moved.

10 Claims, 9 Drawing Figures

OPERATION DEVICE OF TAPE RECORDER

LIST OF PRIOR ART REFERENCES (37 CFR 1.5 (a))

The following reference is cited to show the state of the prior art:
Japanese Laid-open of Patent Application No. 50-23803 (1975), Suzuki, July 5, 1973

The present invention relates to an operating device for tape recorders and, more particularly, an operating device capable of reducing the effect required for putting the recorder into constant speed tape-feeding operations, as well as facilitating the caretaking recording and time-started playback operations.

Conventional tape recorders are operated either manually or by means of an solenoid-actuated operating device. The manual operation generally requires impractically large operating effort which, especially in case of the playback operation, is as large as 1 to 2 Kg. On the other hand, the solenoid-actuated operating device affords a switching of the mechanisms with a small operating effort. However, these solenoid-actuated operating devices also involve various problems such as raised cost of the tape recorder, increments of size and weight, increased power consumption and so on, due to the incorporation of expensive parts such as solenoid, electric circuits, switches and so forth.

Under these circumstances, Japanese Patent Laid-open Publication No. 50-23803 (1975) discloses an operating device which can switch the mechanisms with an extremely small effort, by making use of a part of the power of the tape-driving motor.

More specifically, this operating device has a first gear driven by the tape-driving motor and a second gear having two diametrically opposing non-toothed portions. The second gear opposes to the first gear at one of its non-toothed portions, so that two gears do not mesh each other, when the tape recorder is kept in the stopped condition. The second gear is biased for a rotation by a spring, but is prevented from rotating by a starting plate. As the recording and playback button, forwarding button or the rewinding button is depressed, the starting plate is disengaged from the second gear to release the same, so that the second gear may rotate into engagement with the first gear. Consequently, one of a head-mounting plate, which carries magnetic heads and pinch rollers, a forwarding rod and a rewinding rod is selectively shifted by a shifting plate which in turn is driven by the second gear, so as to put the tape recorder into the desired state of operation.

In this arrangement, the heat-mounting plate, forwarding rod and the rewinding rod are held by the shifting plate itself which is adapted to be displaced by the rotation of the second gear. In other words, the push buttons have no specific retaining or supporting means of their own. Therefore, the holding of the head-mounting plate, forwarding rod or the rewinding rod is effected indirectly by the effort exerted on the buttons, through the release of the second gear from the starting plate, rotation of the second gear and then through the movement of the shifting plate. This means that the push buttons have to be kept depressed for a considerably long period at each time of the switching of operations.

At the same time, for holding the head-mounting plate, forwarding rod or the rewinding rod, it is indispensable that the first gear is being rotated, i.e. that the power source is turned on to energize the motor, which inconveniently hinders the application of the tape recorder to the uses of caretaking automatic recording and timer-started automatic playback, which are becoming essential functions of the tape recorder, unless a specific means are additionally provided, because the power switch is normally kept off and turned on at the demanded time.

For information, in conventional tape recorders, it is necessary to effect two steps of operations of playback operation and pausing operation for retracting the pinch roller from the capstan, in order to set the tape recorder for automatic timer-started playback, and the pausing is released by the timer, so that the mechanism is inevitably rendered complicated, resulting in a raised cost of the tape recorder.

It is therefore an object of the invention to provide a tape recorder capable of affording recording and playback operations, which have been obtained only through a considerably large effort on the push buttons, by a soft touch of a finger on the buttons with a much reduced force, as well as switching to the caretaking automatic recording and to the timer-started playback operations simply by depression of corresponding push buttons.

To this end, according to the invention, there is provided an operating device of a tape recorder comprising a manual operating system having a play operation member adapted to be displaced by a playing operation and a first locking member adapted to hold the play operation member at the position to which the latter has been displaced; and an automatic operating system having an actuating plate adapted to control the movement of the mechanisms including the tape-driving system between their playing and stopping positions, a second locking member adapted to hold the mechanisms at positions to which they have been displaced, a first rotary body adapted to be rotated in relation with the operation of a motor, and a second rotary body including an engaging portion for rotatively engaging the first rotary body and a non-engaging portion adapted not to engage the first rotary body; wherein the operation member is held by the first locking member at the position to which it has been displaced, once it is operated, and the displacing force on the operation member is transmitted as an initial torque to the second rotary body, which has faced the first rotary body at its non-engaging portion, to rotate and bring the same into torque transmitting engagement with the first rotary body, so that the second rotary body may come to be driven by the first rotary body, so as to displace, through the actuating plate, the mechanisms into the playing position and hold the mechanisms by the second locking member.

According to the above stated arrangement, the switching is triggered by a light manual force, while the shifting or heavy mechanisms which requires a large force is performed by the power of the motor. At the same time, for setting the tape recorder for caretaking automatic recording and timer-started automatic playback operations, the tape recorder is turned into the stand-by condition by holding the operation member, by the first locking member, by simply depressing the button, so as to hold the second rotary body in engagement with the first one. Then, the mechanisms are shifted to the playing position to put the recorder into the desired operating conditions, as soon as the power source is switched on by the telephone or by the timer.

The above and other objects, as well as advantageous features of the invention will become more clear from the following description of the preferred embodiments taken in conjunction with the accompanying drawings in which:

FIGS. 1 through 6 inclusive show an operating device of a tape recorder, embodying the present invention, wherein

FIGS. 7 through 9 inclusive show examples of improvements of two parts incorporated in the first embodiment, wherein FIG. 7 is a partial enlarged view of an example of improvement of the second rotary body as incorporated in the first embodiment, while

Hereinafter, the invention will be described in detail through an embodiment, by way of example, with reference to the attached drawings.

Figure 1:
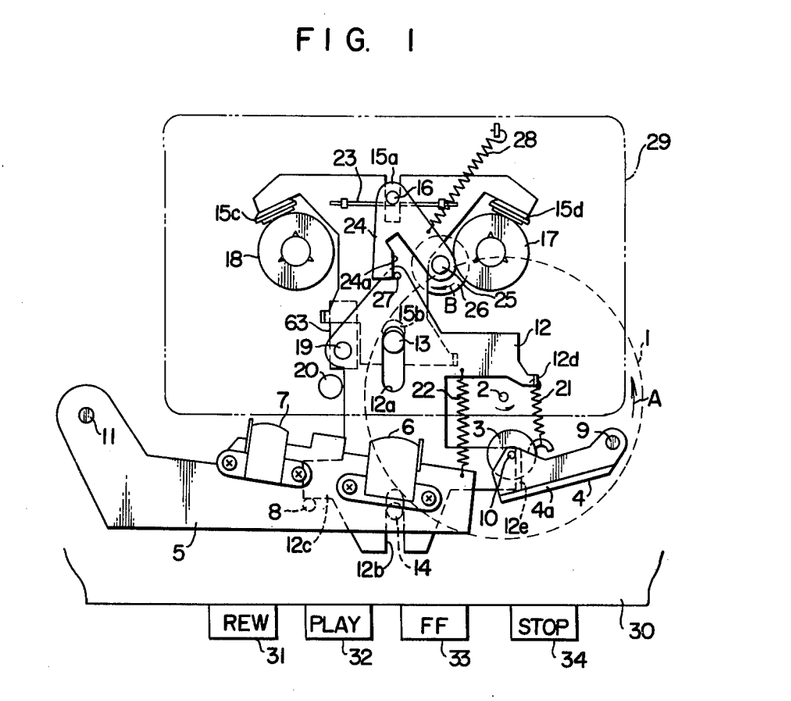
FIG. 1 is a top plan view of a chassis of the tape recorder in the stopped state.

Referring first to FIG. 1 showing a plan view of an embodiment of the invention, a fly-wheel 1 to which a capstan 2 is secured and reel bads 17, 18 are mounted on a chassis 30. Also, a pinch roller arm 4 is rotatably mounted on the chassis 30. A pinch roller 3 is rotatably carried by the arm 4, through a shaft 10, for free rotation around the axis of the latter.

A torque is imparted to the fly-wheel 1, so as to rotate the latter in the direction of an arrow A, by a motor (not shown) through a belt (not shown).

A head plate 5, which is rotatably mounted on the chassis 30 through a shaft 11, carries magnetic heads 6, 7. A play plate 12 is slidably mounted on the chassis 30, with its guide portions 12a, 12b guided by guide pins 13, 12 provided on the chassis 30. A spring 22 is stretched between the play plate 12 and the head plate 5. A pin 8 provided on the head plate 5 abuts a projection 12c of the play plate 12, so that the head plate 5 is located by the play plate 12. Similarly, another spring 21 is stretched between the pinch roller arm 4 and a projection 12d of the play plate 12, and the play plate 12 is abutted at its portion 12e by a rib 4a of the pinch roller arm 4, so as to be located by the latter.

A take-up arm 24 is rotatably mounted on the chassis 30 through a shaft 16 and carries a pulley 26, which is adapted to be rotated in the direction of an arrow B from a motor (not shown) through a belt (not shown), and a roller 25 coaxial with the pulley 24. A spring 28 is stretched between the take-up arm and the chassis 30. A pin 27 provided on the play plate 12 abuts a cam section 24a of the take-up arm 24, so as to locate the latter.

A brake plate 15 is slidably mounted on the chassis 30, with its guide portions 15b, 15a guided by a guide pin 13 and a shaft 15, respectively.

A spring 23 stretched between the shaft 16 and the brake plate 13 biases the latter, so as to bring brake shoe portions 15d, 15c of the brake plate 15 into contact with the reel beds 17, 18, at a suitable contacting pressure.

Reference numerals 29, 31, 32, 33 and 34 denote, respectively, a cassette, a rewinding button, a play button, a forward button and a stop button.

In FIG. 1, the taperecorder is shown in the stopped condition, with none of the buttons being depressed.

The play plate 12 carries a pin 19 which extends through a bore 63 formed in the chassis 30 to the another side of the chassis 30.

Figure 2:
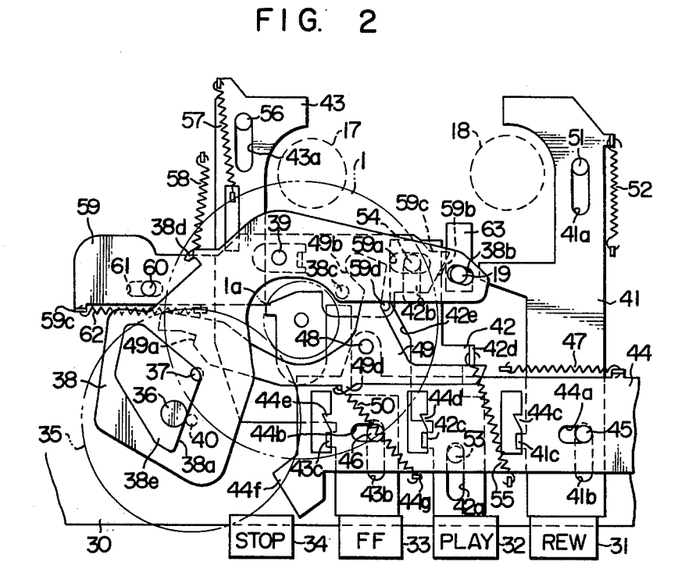
FIG. 2 is a bottom plan view of the chassis as shown in FIG. 1 in the stopped state.

Referring now to FIG. 2 which is a bottom plan view of the chassis 30 as shown in FIG. 1, also in the stopped condition, a rewinding slider 41 is fixed to the rewinding button 31. The rewinding slider 41 is slidably mounted with its guide portions 41a, 41b guided by guide pins 51, 45 on the chassis. A spring 52 is stretched between the chassis 30 and the rewinding slider 41. Although not illustrated, a depression of the rewinding button 31 causes a release of the brake plate 15 and a pressing of an idler to the reel bed 18, as is well known to those skilled in the art, so as to make the tape recorder perform the rewinding operation.

A play slider 42 fixed to the play button 32 is slidably carried by the chassis 30, with its guide portons 42a, 42b guided by guide pins 53, 54 mounted on the chassis 30. A spring 55 is stretched between the chassis 30 and the play slider 42. Similarly, a forwarding slider 43 fixed to the forwarding button 33 is slidably carried by the chassis 30, with its guide portions 43a, 43b guided by guide pins 56, 46 on the chassis 30, and a spring 57 is stretched between the chassis 30 and the forwarding slider 43. Although not illustrated, a depression of the forwarding button 33 causes a release of the brake plate 15 and a pressing of an idler to the reel bed 17, as is well known to those skilled in the art, so that the tape recorder performs the forwarding of the tape.

A lock member 44 is adapted to lock any one of the switches when it is depressed, at the depressed position. The lock member 44 is slidably mounted on the chassis 30, with its guiding portions 44a, 44b guided by guide pins 44a, 44b on the chassis 30. A spring 47 is stretched between the chassis 30 and the lock member 44. The locking member 44 is provided at its portions confronting upright sections 41c, 42c and 43c of the sliders 41, 42 and 43, with holding cam sections 44c, 44d, 44e, and, at its portion confronting the stop button 34, with an inclined surface 44f.

An actuating member 49 is rotatably secured to the locking member 49, through a shaft 48, and is biased counter-clockwisely, by a spring 50 which is stretched between a tab 49d thereof and a tab 44g of the locking member 44. An upright section 42d of the play slider 42 abuts one end of the actuating member 49, so as to locate the latter.

The spring 55 has been selected to have a force large enough to overcome the counter-clockwise rotation of the actuating member 49 caused by the spring 50.

Figure 3:
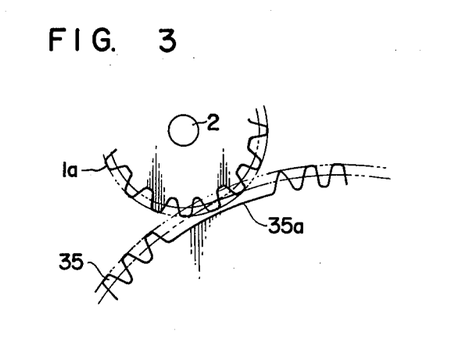
FIG. 3 is a partial enlarged view of a first and a second rotary bodies installed on the chassis of FIG. 2.

A circle 35 shown by two-dots-and-dash line represents a gear rotatably carried on the chassis 30 through a shaft 40 and having a non-toothed portion 35a as shown in FIG. 3. The gear 35 is so positioned as to be able to engage a gear 1a formed coaxially and unitarily with the fly-wheel 1. However, in the normal state, the gear 35 confronts the gear 1a at its non-toothed portion 35a, so that both gear do not mesh each other. Namely, in the normal state, the gear 35 is positioned out of control of the motor. However, when it happens to be triggered by an external torque to bring its toothed portion into the position confronting the gear 1a, the gear 35 is put into a torque transmitting relationship with the motor, and, once the motor is energized, the gear 35 is rotated until the non-toothed portion thereof is brought again to confront the gear 1a. Although not shown, an adequate load is always applied to the gear 35, in the axial direction thereof, so that the gear 35 is always subjected to a torque load.

At the same time, the gear 35 carries pins 36, 37. One 36 of these pins is in contact with the cam portion 38a of a bore 38e formed in a play arm 38 which is rotatably mounted on the chassis 30 through a shaft 39, while the other 37 extends up to the height which corresponds to the actuating portion 49a of the actuating member 49. At the other end of the play arm 38, formed is an elongated bore 38b which loosely receives the pin 19 extending through the bore 63 of the chassis from the play plate 12. Further, the play arm 38 is biases for clockwise rotation, by a spring 58 which is stretched between a tab 38d of the play arm 38 and the chassis 30. A pin 38c provided at the back side of the play arm 38 is positioned to confront a curved section 49 of the actuating member 49. A locking member 59 for the pin 19 is secured to the chassis 30 for free lateral sliding movement, through engagements of the pins 54 and 60 which are provided on the chassis 30 and the locking member 59, respectively, with elongated bores 59a and 61 which are formed in the locking member 59 and the chassis 30, respectively.

A spring 62 is stretched between the chassis 30 and a tab 59e of the locking member 59. The right-hand side end portion of the locking member 59 is formed to have a tapered edge 59b and a holding section 59c. Further, a pin 59d is provided on the locking member 59, so as to contact the cam section 42e of the play slider 42, thereby to locate the locking member 59.

Supposing here that the play button 32 is depressed in the direction of an arrow X, in the stopped state of the described arrangement as shown in FIG. 2, the upright section 42c of the play slider 42 presses the inclined surface of the holding cam section 44d of the locking member 44, so that the latter 44 is forced to move in the direction of the arrow Y, against the biasing force of the spring 55. At the same time, the play slider 42 is depressed resisting to the force of the spring 55. Consequently, the actuating member 49, which is located by the upright section 42d of the play slider 42, is moved slightly rightward, and comes to be rotated counter-clockwise by the force of the spring 50.

Figure 4:
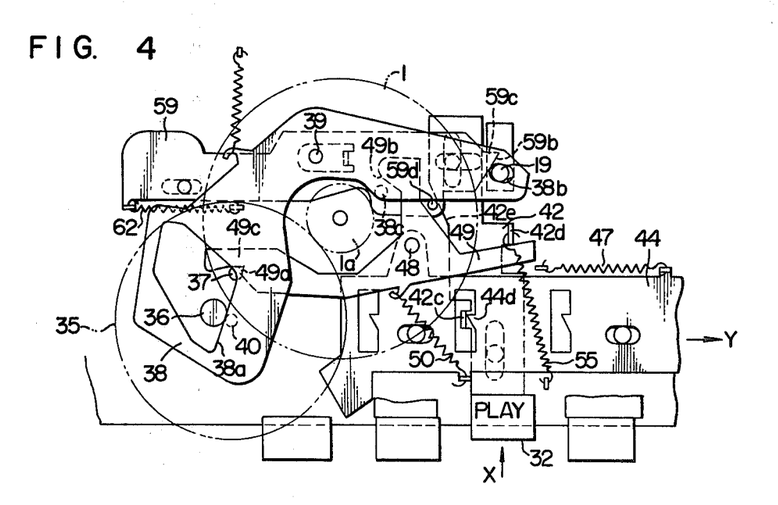
FIG. 4 is a bottom plan view of the chassis on the way of switching from the stopped state as shown in FIG. 2 to the state of playing operation.
Figure 5:
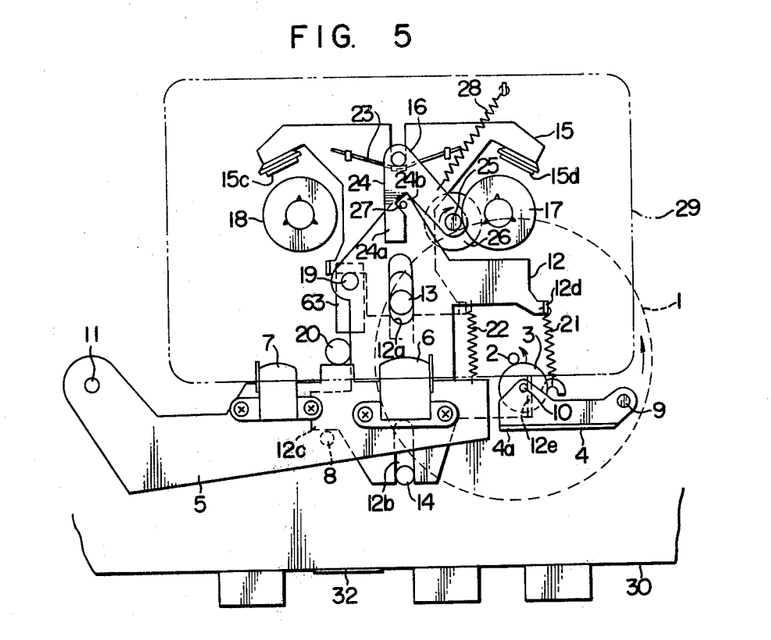
FIG. 5 is a top plan view of the chassis in the playing condition.

As the play button 32 is further depressed, the actuating member 49 comes to abut at its left-hand side end 49c the pin 37 of the gear 35, and is prevented from being further rotated, as will be seen from FIG. 4. At this time, the upright section 42c of the play slider 42 has reached the uppermost portion of the inclined surface of the holding cam section 44d of the locking member 44, so that the rightward sliding movement of the locking member 44 is also suspended.

Meanwhile, since the cam section 42e of the play slider 42 is kept in contact with the pin 62 by the force of the spring 62, the locking member 59 is gradually slided rightward. As the play button is depressed still further, at last the upright section 42c of the play slider 42 comes to ride over the inclined surface of the holding cam section 44d, to reach the operation position. At this moment, the locking member 44 is displaced leftward by the force of the spring 47, so as to lock the play button 32 at the depressed position. Simultaneously, a start switch 100 is turned on. In accordance with the leftward movement of the locking member 44, the actuating member 49, which is connected to the locking member 44 through the shaft 48, is also displaced leftward, so that the actuating portion 49a of the actuating member 49 hits the pin 37 of the gear 35 counter-clockwisely.

Consequently, the gear 35 is rotated slightly, in the counter-clockwise direction, so that the toothed portion of the gear 35 comes to mesh the gear 1a. Thus, the gear 35 is brought into torque transmitting relation with the motor, through the gear 1a. Then, as the motor 102 is supplied with current from the power source 103, through the start switch 100 and the power source switch, the motor is started to drive the fly-wheel 1 which, in turn, drives the gear 35.

After the completion of one rotation, the non-toothed portion 35a of the gear 35 is brought to the position to confront the gear 1a, so that the gear 35 is prevented from being rotated further.

Figure 6:
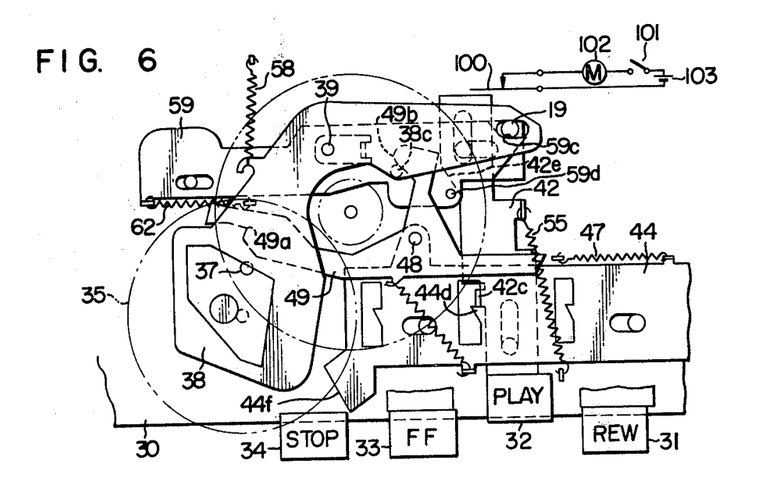
FIG. 6 is a bottom plan view of the chassis in the playing condition.

During the rotation of the gear 35, the pin 36 on the gear 35 presses the cam portion 38a of the play arm 38, so as to rotate the latter 38 counter-clockwise, around the axis of the shaft 39. Consequently, the pin 19, which is loosely received by the right-hand side elongated bore 38b of the play arm 38, is displaced upward along with the play plate 12, into contact with the inclined edge 59b of the locking member 59, and biases the latter slightly leftward, resisting to the force of the spring 62. Finally, the pin 19 rides over the inclined edge 59b, and comes to be locked by the holding portion 59c of the locking member. Meanwhile, the pin 38c of the play arm 38 hits up the curved portion 49b of the actuating member 49, as a result of the rotation of the arm 38, into the position as shown in FIG. 6.

On the other hand, at the upper side of the chassis 30, the play plate 12 is slided upward, by the movement of the pin 19, thereby to move the curved portion 12e away from the rib portion 4a, so that the pinch roller arm 4 is rotated clockwise, around the axis of the shaft 9, by the biasing force of the spring 21. At the same time, since the tab 12c is kept in contact with the pin 8 by the biasing force of the spring 22, the head plate 5 is rotated around the axis of the shaft 11 counter-clockwise. The brake plate 15 is moved upward by the pin 19, resisting to the force of the spring 23, so that the brake shoe portions 15d, 15c are moved away from the reel beds 17, 18.

At the same time, the pin 27 of the play plate 12 is guided by the cam portion 24a of the take-up arm 24, and is slided into the recess 24b of the latter, in accordance with the upward movement of the play plate 12, so that the take-up arm 24 is rotated around the axis of the shaft 16, by means of the spring 28.

Then, as the pin 19 comes to be locked by the holding portion 59c of the locking member 59, the pinch roller 3 is pressed by the spring 21 onto the capstan 2, while the head plate 5 is located by the stopper 20 on the chassis 30 and by the spring 22, so that the heads 6, 7 are inserted into the cassette 29. Simultaneously, the roller 25 of the take-up arm 24 is pressed by the spring 28 onto the reel bed 17, so that the tape recorder is turned into the playback operation of constant tape driving state.

It has been stated that the gear 35 is driven by the torque of the fly-wheel, once the motor is started. Thus, it is to be noted that the sole function of the manually operable play button is to bring the gear 35 into engagement with the gear 1a. The arrangement may be such that the motor is started soon after the play button is depressed to the operation position, or, alternatively, the arrangement may be performed in relation with a timer in such a manner that the motor is not started immediately after the locking of the gear 35 but is started by the operation of the timer. Thus, all what are required are to lock the play button, once it is depressed, at a position to keep the gear 35 in engagement with the gear 1a, so that it may be driven by the motor, and to turn the power supply switch for the motor on.

For bringing the tape recorder from the playback condition as shown in FIG. 6 to the stopped condition, the stop button 34 is depressed to press the inclined edge 44f of the locking member 44, thereby to displace the locking member 44 rightward, resisting to the force of the spring 47. Since the upright section 42c of the play slider 42 is released from the holding cam portion 44d of the play slider 42, the play slider 42 is returned from the operation position to the stop position, due to the biasing force of the spring 55, i.e. by the self-resetting force. During this resetting operation, the cam portion 42e of the slider 42 presses the pin 59d leftward, so that the locking plate 59 is moved against the force of the spring 62, so as to release the pin 19 from the holding portion 59c of the locking plate 59. Consequently, the play arm 38 is rotated clockwise by the force of the spring 58, to the position as shown in FIG. 2.

Meanwhile, also the play plate 12 is retracted to the starting position, due to the release of the pin 19 and the returning of the play arm 38, so that pinch roller arm 4, head plate 5, take-up arm 24 and the brake plate 15 are returned to respective starting positions as shown in FIG. 1.

Although the locking plate is reciprocatorily moved in the lateral direction as a result of the stopping operation in the playback condition as shown in FIG. 6, the actuating portion 49a of the actuating member 49 does not contact the pin 37 of the gear 35, because the position of the actuating member 49 is limited by the play arm 38. In addition, the switch 100 is kept off in this state. Therefore, it can never take place that the gear 35 is accidentally driven.

Turning again to FIG. 2, when the rewinding button 31 or the forwarding button 33 is depressed, corresponding slider 41 or 43 is locked at the operation position by the locking member 44 and the spring 47, as is the case of the playback operation. However, in such a state, the gear 35 is not rotated, because the position of the actuating member 49 is limited by the upright section 42d of the play slider.

From the view point of operations of parts of the mechanism, the playback operation of the tape recorder in accordance with the invention can be considered to consist of a manual operation step and an automatic actuation step. More specifically, the manual operation step consists in depressing the play slider 42, against the force of the spring 55 and the spring 47 biasing the locking member, so as to make the locking member 44 lock the play slider 42. On the other hand, the automatic actuation step includes a series of operations of the rotation of the actuating member 49 caused by the movement of the locking member 44 from the position of FIG. 4 to the position of FIG. 6, engagement of the actuating portion 49a of the actuating member 49 with the pin 37, rotation of the gear 35 to bring the toothed portion thereof into driving engagement with the gear 1a, while the non-toothed portion is moved away from the gear 1a, rotation of the pin 36 as a result of the energization of the motor, rotation of the play arm 38, upward movement of the pin 19, i.e. the upward movement of the play plate 12 performed through the elongated bore 38b, and the locking of the play plate 12 at the raised position by the holding portion 59c of the locking member.

Thus, according to the invention, most of the playback operation, which generally requires a large effort, is performed automatically making use of the driving power of the rotary body of the tape running system, so that only an extremely manual effort is required. Thus, the playback operation can be triggered by a slight touch of the finger.

At the same time, whether the locking member 59 can lock the pin 19, i.e. whether the locking member 59 is relatively positioned to the pin 19 for locking the latter or not, is determined by the pin 59d of the locking member 59 and by the cam portion 42e of the play slider 42, so as to ensure that the locking of the pin 19 in the automatic actuation step and the locking of the play slider 42 in the manual operation step are performed in an interlocked manner. The release of the pin 19 and the relase of the play slider 42 coincides with each other.

Since the playback operation is performed in two steps of the manual operation and the automatic actuation, the manual depression of the play button, under the state in which the power is not supplied to the motor, e.g. when the power source switch has been turned off, can cause only the locking of the play slider and the turning on of the power supply switch 100, so that no driving torque is applied to the switching gear the motor. Thus, the displacement of the head plate into the cassette, as well as the displacement of the pinch roller into cooperation with the capstan, is not carried out, unless the power is supplied to the motor.

For an automatic recording or playback at a desired time making use of a timer, the tape recorder is put into the stand-by condition by simply depressing the play button. The tape recorder will then turn to the recording or reproduction automatically, when the power source switch is turned on by the timer. During this stand-by condition, no deflection of the pinch roller is caused, because it is kept away from the capstan.

Figure 7:
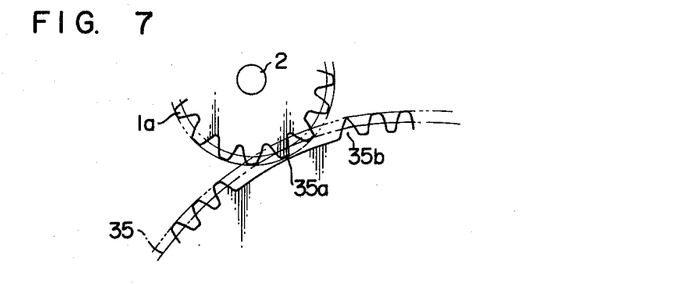
Figure 8:
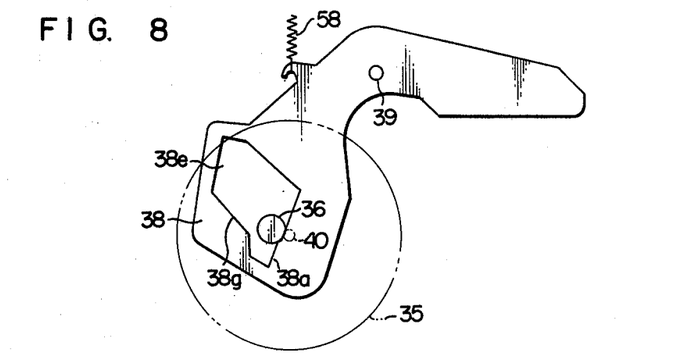
FIGS. 8 and 9 are bottom plan views of an example of improvement of a play arm as incorporated in the first embodiment, at different positions corresponding to two rotational positions of the second rotary body.
Figure 9:
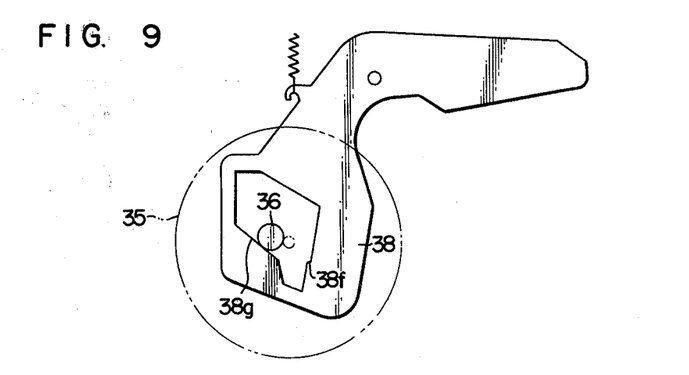

FIGS. 7 through 9 show examples of modifications of two parts which are incorporated in the tape recorder in accordance with the invention. More specifically, FIG. 7 relates to an improvement of the switching gear 35, while FIGS. 8 and 9 are concerned with an improvement of the play arm 38.

Referring first to FIG. 7 showing the switching gear 35 out of engagement with the driving body 1a of the tape driving system, the edge of the first tooth 35b, which is adapted to be brought into engagement with the rotary body is preceding other teeth when the switching gear is slightly rotated counterclockwise, is so sharpened as to smoothen the switching of the gear 35 into engagement with the rotary body 1a.

Referring now to FIGS. 8 and 9 showing an example of improvement of the bore 38e of the play arm 38, a stepped portion 38f and a checking portion 38g are formed at the cam portion 38a. Namely, the stepped portion 38f ensures the safe engagement of the play arm 38 with the switching gear 35, in the state as shown in FIG. 2 (FIG. 4), while the checking portion 38g is adapted to prevent, through contacting the pin 36 of the switching gear 35, the switching gear 35 from engaging again the rotary body 1a due to its inertia, when the switching gear has been rotated by one turn to bring its non-toothed portion again to confront the rotary body 1a via an engaging condition. In the embodiment as shown in FIGS. 1 to 6, as has been stated, an adequate load is applied to the switching gear 35, in the thrusting direction of the same, so as to impart a constant load torque to the switching gear, thereby to suppress the inertia of the same. It will be seen that the effect of supression of the inertia is enhanced by the provision of the checking portion 38g.

What is claimed is:

1. An operation device of a tape recorder comprising:
   (a) A tape running driving system including, at least, a capstan adapted to be rotatively driven by a motor, a pinch roller mounted to confront said capstan for a movement to and from the latter, so as to cooperate with said capstan in feeding the tape at a constant speed, and a play plate adapted to control the movement of said pinch roller toward and away from said capstan;
   (b) a manual operating system including a manually operable operation member for constant-speed tape feeding adapted to be displaced from a stopping position to an operation position, and a first locking member adapted to lock said manually operable operation member at said operation position;
   (c) a first rotary body adapted to be rotated in relation with the rotation of the shaft of said motor; and
   (d) and an automatic operation system including a second rotary body having an engageable portion engageable with said first rotary body and a non-engageable portion which cannot engage said first rotary body, said second rotary body being adapted to confront said first rotary body at its non-engageable portion when said operation member is not operated, but to be rotated when an initial torque is imparted thereto by the operation of said operation member, so as to bring said engageable portion to confront said first rotary body, so that it may be driven continuously by said first rotary body in accordance with the rotation of the latter, until said non-engageable portion comes again to confront said first rotary body, an actuating plate adapted to be displaced by the rotation of said second rotary body, so as to displace said play plate, thereby to put said pinch roller into cooperation with said capstan, and a second locking member adapted to lock said play plate at a position to which said play plate has been displaced.

2. An operation device of a tape recorder as claimed in claim 1, characterized in that said manually operable constant-speed tape feeding and said first locking member are disposed in the vicinity of said second rotary body, that said operation member being normally biased by a first resilient member into said stopping position, while said first locking member is biased by a second resilient member toward said second rotary body, so that the locking of said operation member by said first locking member is performed by at first displacing said first locking member, against the biasing force of said second resilient member, through the displacement of said operation member and then allowing said first locking member to be returned by said second resilient member, that an actuating member having an axis of rotation fixed on said first locking member and rotatively biased by a third resilient member, said actuating member having at its one end an actuating portion, while the other end thereof being in contact with a part of said operation member for constant-speed tape feeding thereby to lock said actuating member against said biasing force, so that the rotational position of said actuating member is determined in accordance with the position of said operation member, and that a first pin provided on said second rotary member is adapted to be pressed by said actuating portion of said actuating member, as a result of the returning movement of said first locking member caused by said second resilient member for locking said operation member at said operation position, thereby to cause a slight rotational movement of said second rotary body.

3. An operation device of a tape recorder as claimed in claim 1, characterized in that said second rotary body has a first pin through which the power from said manual operation system is transmitted to said second rotary body and a second pin through which the torque of said second rotary body is transmitted to said actuating plate, that said actuation plate having a driven portion adapted to be contacted, for the torque transmission, by said second pin on said second rotary body and a bore adapted to receive a pin formed on said play plate, that said second locking member is biased by a fourth resilient member toward said pin on said play plate and has at its portion confronting said pin an inclined edge and a holding portion connected to the latter, and that said pin to said play plate is moved through said actuating plate by the torque of said second rotary body and, during the movement, contacts said inclined edge of said second locking member to displace the latter against the biasing force of said fourth resilient member, whereby said second locking member is allowed to return by the force of said fourth resilient member, when said pin on said play plate has passed the end portion of said inclined edge, thereby to make said play plate be held at that position by said holding portion of said second locking member.

4. An operating device of a tape recorder as claimed in claim 3, wherein said actuating plate is disposed in such a manner that a portion thereof lies over said second rotary body, and has an opening formed in said portion lying over said second rotary body and adapted to receive said second pin of said second rotary body, an edge of said opening constituting said driven portion with which said second pin of said second rotary body engages to transmit the torque.

5. An operating device of a tape recorder as claimed in claim 4, wherein one of other edges of said opening constituting a checking portion adapted to be contacted by said second pin when said second rotary body is rotated by a predetermined angle, thereby to resist to the further rotation of said second rotary body.

6. An operation device of a tape recorder as claimed in claim 1, wherein said first rotary body consists of a wheel or gear having gear teeth formed over the entire periphery thereof, while said second rotary body consists also of a wheel or gear but having a non-toothed portion in its periphery.

7. An operation device of a tape recorder as claimed in claim 6, wherein the first tooth of the second gear which engages the first gear preceding other teeth is so sharpened that the second gear may be smoothly brought into engagement with the first gear.

8. An operation member of a tape recorder as claimed in claim 1, characterized in that said operation member for constant-speed tape feeding and said second locking member are disposed for relative movement substantially in orthogonal directions, that said operation member is biased toward said stopping position by said first resilient member, while said second locking member is so biased toward said operation member by a fourth resilient member that a pin on said second locking member and a cam portion provided on said operation member are always kept in contact with each other by the force of said fourth resilient member, thereby to cause, when said operation member is positioned at said operation position, a slight movement of said second locking member toward said operation member due to the contact of said pin and said cam portion with each other, and that said play plate can be locked by said second locking member only when the latter has been displaced, the locking of said play plate by said second locking member being possible upon engagement of said cam portion of said operation member with said pin of said second locking member, during the returning movement of said operation member.

9. An operation device of a taper recorder comprising: a slider having an upright section and a cam portion and adapted to be slidingly moved in relation with a manual operation, said slider being biased toward a stopping position by a first reslient member; a first locking member slidably mounted on a chassis and biased by a second resilient member in one direction, said first locking member having a locking portion for locking said upright section of said slider; a play plate associated with magnetic heads and a pinch roller and provided at its one end with a pin, a tape running driving system including a capstan confronting said pinch roller and a flywheel adapted to rotate unitarily with said capstan; an actuating member having an axis of rotation on said first locking member and provided at its one end with an actuating portion, said actuating member being rotatively biased by a third resilient member but being prevented from rotating by a contact with said slider; a switching gear having an engageable and a non-engageable portions which are engageable and not engageable with a rotary body included by said tape running driving system, said switching gear further having a first pin adapted to be pressed by said actuating portion of said actuating member when the latter is rotated and a second pin; a play arm having a cam portion adapted to be contacted by said second pin of said switching gear and an engaging portion adapted to loosely receive said pin of said play plate, said play arm being biased by a fifth resilient member for a rotation around an axis located on said chassis, and adapted to be rotated against the force of said fifth resilient member by said second pin of said switching gear when the latter is rotated; and a second locking member slidably held by said chassis and having a pin biased by said fourth resilient member toward said slider into engagement with said cam portion of said slider and a holding portion for holding said pin of said play plate.

10. In a tape recorder having a chassis carrying a tape running driving system including a motor, two reel beds and a capstan and adapted to run the tape between said two reel beds; and a head plate slidably mounted on said chassis and biased for an automatic returning movement from an operation position to a stopping position, said head plate carrying heads and a pinch roller which are normally held at said stopping position where they are kept away from said tape, but are brought into said operation position where they contact said tape when there is a playing demand;

an operation device characterized by comprising:
(a) a first locking member adapted to prevent said automatic returning movement of said head plate when the latter is brought to said playing position, thereby to lock said head plate at said playing position;
(b) driving means capable of assuming a first position for driving engagement with said motor and a second position out of said driving engagement, said driving means being normally held at said second position and adapted, once moved to said first position, to receive a torque from said motor and transmit the resulting force to said head plate so as to displace the latter to said playing position, and to get back to said second position;
(c) manually operable operation means adapted to be moved between a stopping position and an operation position and positioned normally at said stopping position due to its self-returning force, said operation means being further adapted to be moved from said stopping to said operation positions, against said self-returning force, by a manual playing operation of the operator, so as to bring said driving means normally held at said second position into said first position;
(d) a second locking member adapted to lock said manually operable operation member at said operation position, independently of the functioning of said first locking member, when said manually operable member is brought to said operation position;
(e) power source means including a power supply switch adapted to be closed when said manually operable operation member is held at said operation position, so as to supply a power to said motor; and
(f) stopping means for releasing said head plate and said manually operable operation member from said first and second locking members.

* * * * *